(12) United States Patent
Nagashima et al.

(10) Patent No.: US 10,921,843 B2
(45) Date of Patent: *Feb. 16, 2021

(54) ACCELERATOR PEDAL DEVICE

(71) Applicant: MIKUNI CORPORATION, Tokyo (JP)

(72) Inventors: Jun Nagashima, Kanagawa (JP); Satoshi Miyazaki, Kanagawa (JP); Kazunari Nakashima, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/472,205

(22) PCT Filed: Nov. 30, 2017

(86) PCT No.: PCT/JP2017/043204
§ 371 (c)(1),
(2) Date: Jun. 21, 2019

(87) PCT Pub. No.: WO2018/123436
PCT Pub. Date: Jul. 5, 2018

(65) Prior Publication Data
US 2020/0192415 A1 Jun. 18, 2020

(30) Foreign Application Priority Data
Dec. 28, 2016 (JP) .............................. JP2016-255152

(51) Int. Cl.
*G05G 1/30* (2008.04)
*G05G 5/03* (2008.04)
(Continued)

(52) U.S. Cl.
CPC ............. *G05G 1/44* (2013.01); *B60K 26/021* (2013.01); *G05G 5/03* (2013.01); *G05G 5/05* (2013.01)

(58) Field of Classification Search
CPC B60K 26/02; B60K 26/021; B60K 2026/026; B60K 2370/131; G05G 5/03;
(Continued)

(56) References Cited

U.S. PATENT DOCUMENTS 6,658,963 B2 * 12/2003 Yaddehige ............... G05G 1/30
74/473.16
6,860,170 B2 * 3/2005 DeForest ................. G05G 1/30
74/512

(Continued)

FOREIGN PATENT DOCUMENTS

JP 2003072413 3/2003
JP 2003136999 5/2003
(Continued)

OTHER PUBLICATIONS

Machine translation of JP 2003-237405 A obtained on Mar. 26, 2020.*

(Continued)

*Primary Examiner* — Adam D Rogers
(74) *Attorney, Agent, or Firm* — JCIPRNET

(57) ABSTRACT

This accelerator pedal device includes a pedal arm having an accelerator pedal, a housing that supports the pedal arm so as to be capable of swinging about a prescribed axis line between a rest position and a maximum push position, a slider that slides over an inner wall of the housing, a contact part formed on the pedal arm in order to exert pressing force while separably coining into contact with the slider, and an urging spring disposed between the housing and the slider so that the urging force pressing the slider against the inner wall and the contact part increases in accordance with the pushing of the accelerator pedal.

13 Claims, 11 Drawing Sheets

(51) Int. Cl.
*G05G 1/44* (2008.04)
*G05G 5/05* (2006.01)
*B60K 26/02* (2006.01)

(58) Field of Classification Search
CPC .. G05G 5/05; G05G 1/30; G05G 1/44; G05G 1/445
See application file for complete search history.

(56) References Cited

U.S. PATENT DOCUMENTS

| | | | | |
|---|---|---|---|---|
| 8,161,842 B2* | 4/2012 | Kim | ............ | B60K 26/021 |
| | | | | 74/513 |
| 8,534,157 B2* | 9/2013 | O'Neill | ............ | G05G 1/30 |
| | | | | 74/512 |
| 8,806,977 B2* | 8/2014 | Stewart | ............ | B60K 26/021 |
| | | | | 74/512 |
| 9,075,427 B2* | 7/2015 | Muraji | ............ | B60K 26/021 |
| 9,079,492 B2* | 7/2015 | Osawa | ............ | B60K 26/02 |
| 9,671,815 B2* | 6/2017 | Fuller | ............ | G05G 1/44 |
| 9,811,108 B2* | 11/2017 | Kumamoto | ............ | G01B 7/30 |
| 10,401,896 B1* | 9/2019 | Kim | ............ | G05G 5/03 |
| 10,739,810 B2* | 8/2020 | Nagashima | ............ | B60K 26/02 |
| 2006/0230875 A1* | 10/2006 | Ouyang | ............ | G05G 1/30 |
| | | | | 74/560 |
| 2010/0300240 A1* | 12/2010 | Kim | ............ | G05G 1/30 |
| | | | | 74/513 |
| 2013/0091977 A1* | 4/2013 | Fukushima | ............ | B60K 26/021 |
| | | | | 74/513 |
| 2015/0192076 A1* | 7/2015 | Jordan | ............ | F02D 11/107 |
| | | | | 74/514 |
| 2019/0381882 A1* | 12/2019 | Nagashima | ............ | B60K 26/02 |

FOREIGN PATENT DOCUMENTS

| | | | | |
|---|---|---|---|---|
| JP | 2003237405 A | * | 8/2003 | ............ G05G 5/03 |
| JP | 2007276707 | | 10/2007 | |
| JP | 2008184108 | | 8/2008 | |
| JP | 2009532272 | | 9/2009 | |

OTHER PUBLICATIONS

Machine translation of JP 2007-276707 A obtained on Mar. 26, 2020.*
"International Search Report (Form PCT/ISA/210) of PCT/JP2017/043204," dated Feb. 13, 2018, with English translation thereof, pp. 1-4.

* cited by examiner

ACCELERATOR PEDAL DEVICE

CROSS-REFERENCE TO RELATED APPLICATION

This application is a 371 application of the international PCT application serial no. PCT/JP2017/043204, filed on Nov. 30, 2017, which claims the priority benefit of Japan application no. 2016-255152, filed on Dec. 28, 2016. The entirety of each of the above-mentioned patent applications is hereby incorporated by reference herein and made a part of this specification.

BACKGROUND

Technical Field

The present invention relates to an accelerator pedal device applied to a vehicle or the like employing an electronically controlled throttle system, and more particularly to an accelerator pedal device having a mechanism which generates hysteresis in a depressing force of an accelerator pedal.

Description of Related Art

As an accelerator pedal device applied to an electronically controlled throttle system (also referred to as a throttle-by-wire system) in an engine mounted in an automobile or the like, one including a pedal arm having an accelerator pedal, a housing supporting the pedal arm to be swingable, a first return spring disposed in the vicinity of a swing support shaft to return the pedal arm to a rest position, a hysteresis generation mechanism that generates hysteresis in a depressing force of the accelerator pedal, and the like is known (see, for example, Patent Literature 1).

In this accelerator pedal device, the hysteresis generation mechanism is configured by a first slider with which an upper end part of the pedal arm is separably in contact and which slides on an inner wall surface of the housing, a second slider sliding on the inner wall surface of the housing and configured to produce a wedge action in cooperation with the first slider, a second return spring in contact with the second slider and configured to return the pedal arm to the rest position via the first slider, and the like.

However, in the above-described accelerator pedal device, since two independent sliders are included as the hysteresis generation mechanism, the number of parts increases and the structure is complicated. Also, the first slider and the second slider reciprocate linearly in the housing, which causes an increase in size of the housing, an increase in size of the device, or the like.

Also, the first return spring is disposed in the vicinity of the swing support shaft, and the second return spring is disposed in a region in which the first slider and the second slider are disposed.

That is, since the first return spring and the second return spring are configured to be disposed in different regions, parts cannot be disposed together. As a result, a complicated structure, an increase in size of the housing, an increase in size of the device, and the like are caused.

RELATED ART

Patent Literature

[Patent Literature 1]
Japanese Patent Laid-open Publication No. 2008-184108

SUMMARY

Technical Problem

The present invention provides an accelerator pedal device capable of solving the problems of the conventional technology as described above while achieving downsizing or the like.

Solution to Problem

An accelerator pedal device of the present invention is configured to include a pedal arm including an accelerator pedal, a housing configured to support the pedal arm to be swingable about a predetermined axis between a rest position and a maximum depressed position, a slider sliding on an inner wall of the housing, a contact part configured on the pedal arm to exert a pressing force on the slider while separably in contact with the slider, and a biasing spring disposed between the housing and the slider so that a biasing force pressing the slider against the inner wall of the housing and the contact part is increased according to depression of the accelerator pedal.

Here, the slider may be configured to slide on the inner wall of the housing along a predetermined curvature centered on the axis.

The slider may be configured to receive the biasing spring on a second straight line that forms a predetermined acute angle with the first straight line on a side closer to the contact part than the axis.

The slider may be configured in a hollowed-out shape penetrating in a swing direction of the pedal arm.

The slider may include a first outer contour part whose outer contour on a plane perpendicular to the swing direction has a substantially rectangular shape and a second outer contour part whose outer contour on a plane parallel to the swing direction has a substantially fan shape with an acute angle.

The slider may include a cylindrical restricting part fitted inside the biasing spring in an edge region of the circular opening.

The contact part may be configured in contact with the slider on a first straight line passing through the axis.

The pedal arm may include a guide part in the vicinity of the contact part. The guide part guides the slider toward the inner wall of the housing.

The pedal arm may include a cylindrical part centered on the axis, an upper arm extending upward from the cylindrical part, and a lower arm extending downward from the cylindrical part, the upper arm may include the contact part, and the cylindrical part may include a concave relief part in which the biasing spring is disposed in a non-contact manner.

The biasing spring may be a compression type coil spring, and the slider may include a spring receiving part configured to receive the biasing spring, a rectangular opening on a side being contacted with the contact part, and a circular opening on an inner side of the spring receiving part.

The accelerator pedal device of the above configuration may further include a return spring that exerts a biasing force directly on the pedal arm to return the pedal arm to the rest position.

Advantageous Effects of Invention

According to the accelerator pedal device having the above-described configuration, problems of the conventional technology are solved, and it is possible to achieve downsizing or the like and obtain the accelerator pedal device having desired hysteresis characteristics in a depressing force.

DESCRIPTION OF THE EMBODIMENTS

Figure 1:
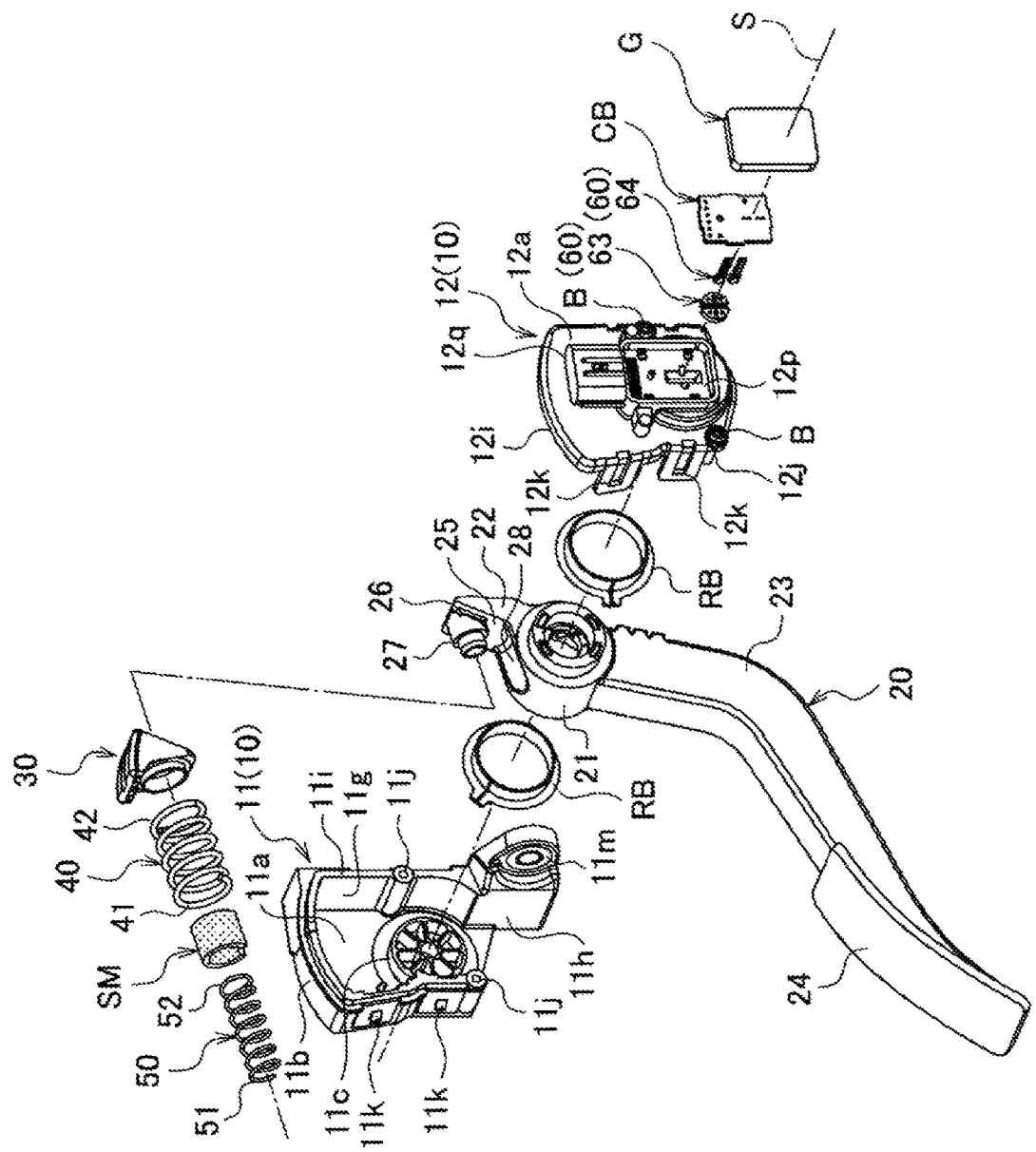
FIG. 1 is an exploded perspective view illustrating one embodiment of an accelerator pedal device according to the present invention.
Figure 2:
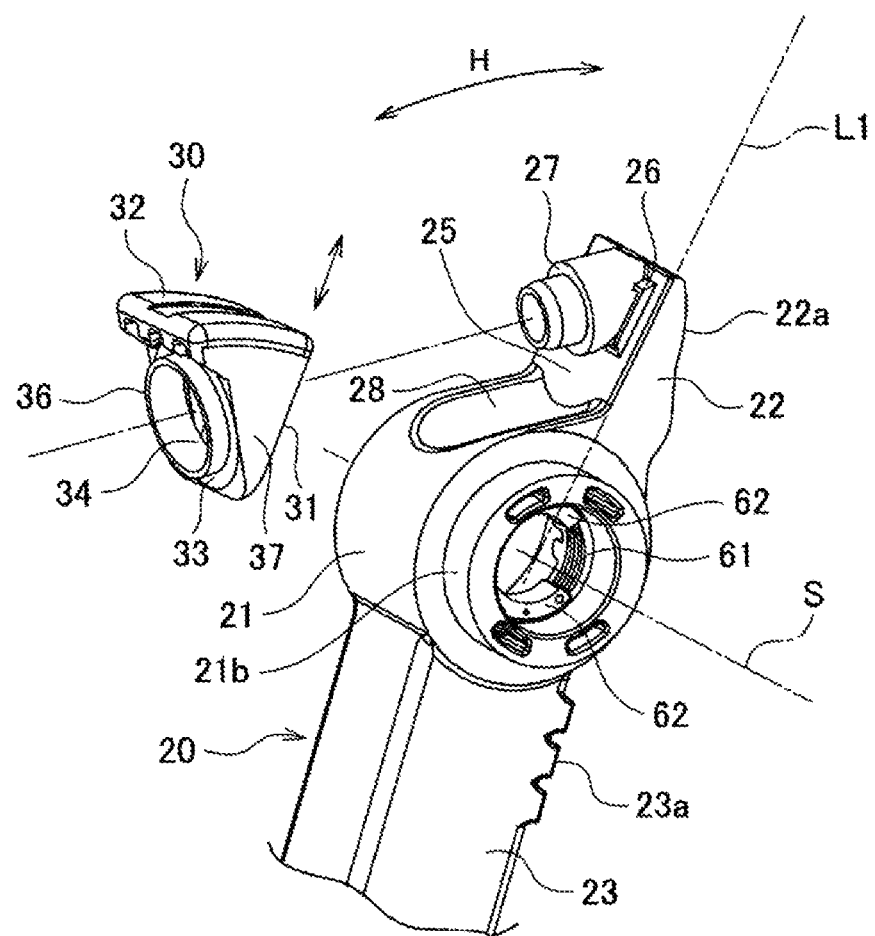
FIG. 2 is a partial perspective view illustrating a pedal arm and a slider included in the accelerator pedal device illustrated in FIG. 1.
Figure 3:
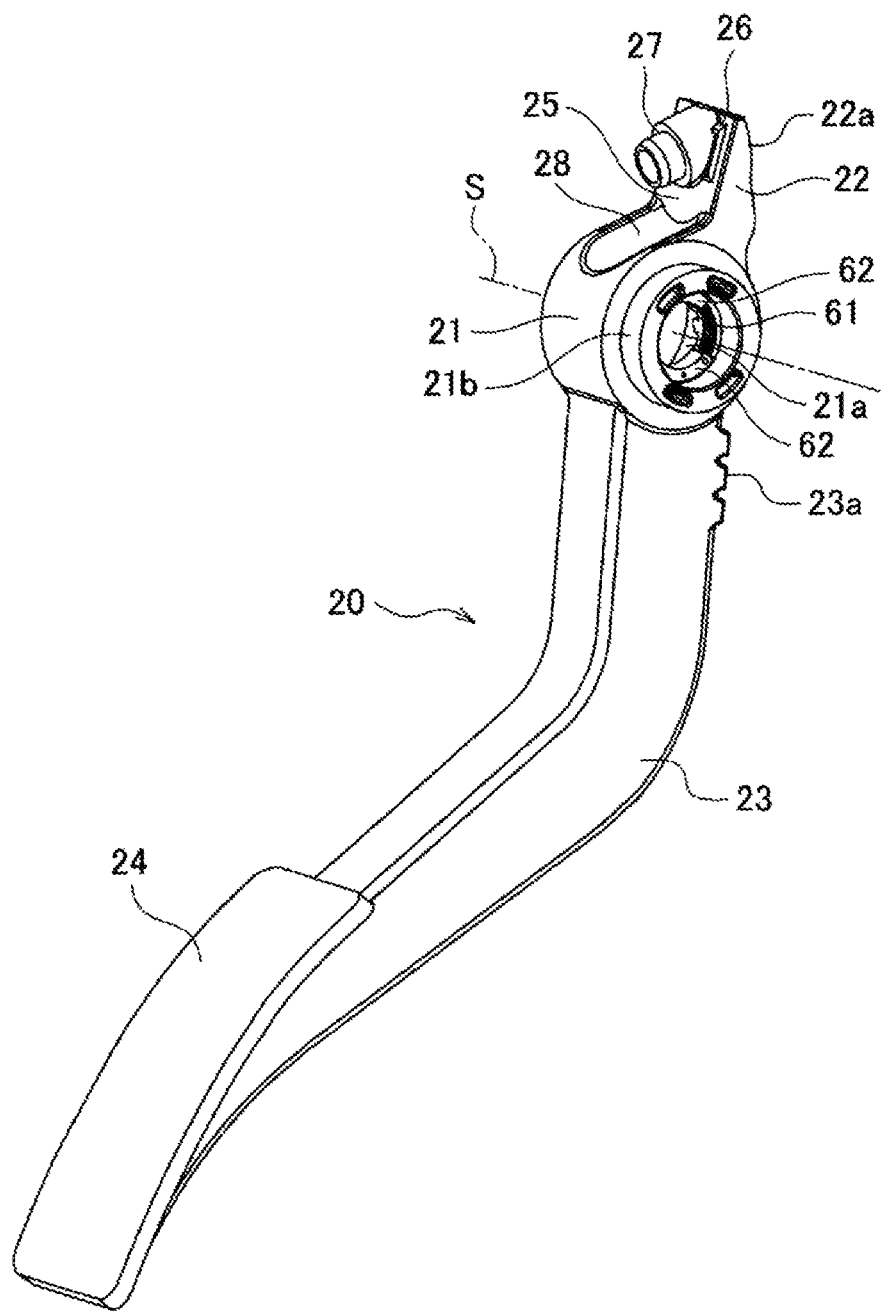
FIG. 3 is a perspective view illustrating the accelerator pedal and the pedal arm included in the accelerator pedal device illustrated in FIG. 1.
Figure 4A:
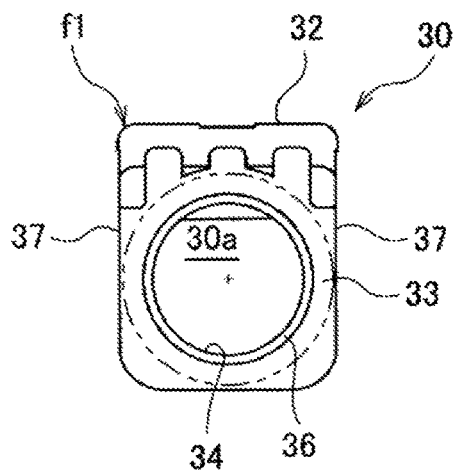
FIG. 4A is a front view of a slider included in the accelerator pedal device illustrated in FIG. 1 when viewed from a side of a biasing spring in a swing direction (sliding direction).
Figure 4B:
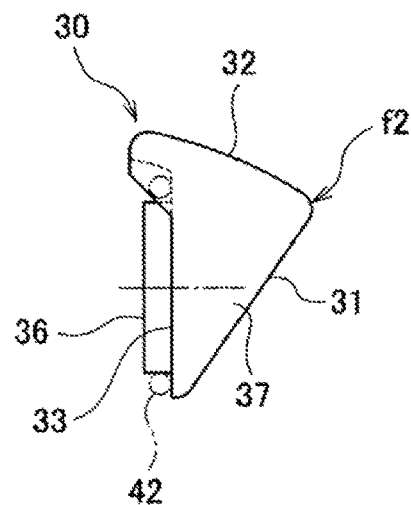
FIG. 4B is a side view illustrating the slider included in the accelerator pedal device illustrated in FIG. 1 when viewed from a side surface direction perpendicular to the swing direction.
Figure 4C:
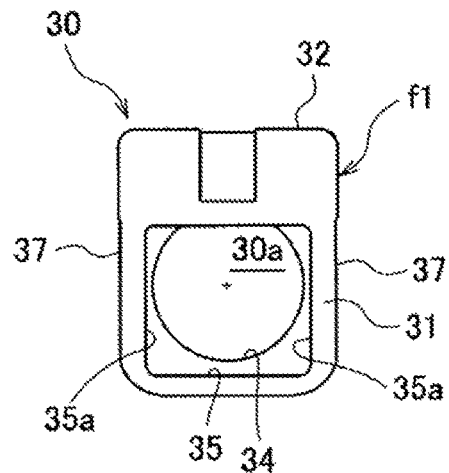
FIG. 4C is a rear view of the slider included in the accelerator pedal device illustrated in FIG. 1 when viewed from a side of a contact part in the swing direction.

Hereinafter, an embodiment of the present invention will be described with reference to FIGS. 1 to 11 of the accompanying drawings.

The accelerator pedal device according to this embodiment includes a housing 10 fixed to a vehicle body such as an automobile, a pedal arm 20, a slider 30, a biasing spring 40, a return spring 50, and a position sensor 60 for detecting a rotational angular position of the pedal arm 20.

The position sensor 60 is constituted by an armature 61, a permanent magnet 62, a stator 63, and a Hall element 64.

Also, the contact part 25 forming a portion of the pedal arm 20, the slider 30, and the biasing spring 40 constitute a hysteresis generation mechanism that generates hysteresis in the depressing force of an accelerator pedal 24.

The housing 10 is formed of a resin material, and is constituted by a first housing 11 and a second housing 12 which are connected to each other and define an axis S.

The first housing 11 includes a side wall part 11a substantially perpendicular to the axis S, an outer peripheral wall part 11b surrounding a periphery of the axis S, a support shaft 11c centered on the axis S, a sliding surface 11d, spring receiving parts 11e and 11f, a rest stopper 11g, a fully open stopper 11h, a connecting part 11i that connects the second housing 12, a screw hole 11j into which a screw B that connects the second housing 12 is screwed, a convex part 11k for snap fitting, and a flange part 11m having a through hole through which a bolt fixed to the vehicle body or the like passes.

The support shaft 11c is formed in a columnar shape to support a cylindrical part 21 of the pedal arm 20 to be swingable about the axis S.

The sliding surface 11d is formed as an arc-shaped surface having a predetermined radius R (curvature 1/R) centered on the axis S on an inner wall of the outer peripheral wall part 11b having a predetermined width in an axis S direction.

The spring receiving part 11e is formed as an annular seating surface for receiving one end part 41 of the biasing spring 40 on the inner wall of the outer peripheral wall part 11b.

The spring receiving part 11f is formed as an annular seating surface for receiving one end part 51 of the return spring 50 on an inner side concentric with the spring receiving part 11e on the inner wall of the outer peripheral wall part 11b.

Here, the side wall part 11a and the outer peripheral wall part 11b define one concave part C in which the biasing spring 40 and the return spring 50 are coaxially disposed in a nested manner in a state in which the pedal arm 20 and the slider 30 are incorporated.

Also, since the concave part C is closed by a side wall part 12a of the second housing 12, the concave part C is formed as one internal space which is curved in a sliding direction (swinging direction) H of the slider 30 and whose cross section perpendicular to the sliding direction H is substantially rectangular, thereby accommodating the slider 40 to be slidable.

The second housing 12 includes a side wall part 12a substantially perpendicular to the axis S, a fitting concave part 12c centered on the axis S, a connecting part 12i connected to the first housing 11, a hole 12j through which a screw B screwed into the first housing 11 passes, a concave part 12k for snap fitting, a columnar embedded part 12n in which the stator 63 and the Hall element 64 which are a portion of the position sensor 60 are embedded, an accommodating part 12p that accommodates a circuit board CB, and a connector 12q that performs electrical connection.

The fitting concave part 12c is formed in a cylindrical shape to support the cylindrical part 21 of the pedal arm 20 so that it is swingable about the axis S.

The embedded part 12n is inserted into the cylindrical part 21 of the pedal arm 20 in a state in which the second housing 12 is connected to the first housing 11 and formed to face the armature 61 and the permanent magnet 62 which are a portion of the position sensor 60 disposed inside the cylindrical part 21.

Then, in a state in which the pedal arm 20, the slider 30, the biasing spring 40, and the return spring 50 are attached to the first housing 11, the second housing 12 is connected to the first housing 11 by a snap-fit connection and fastened by the screw B to cover the whole of the pedal arm 20 except for a lower region thereof in cooperation with the first housing 11.

The pedal arm 20 is entirely molded of a resin material and includes the cylindrical part 21, an upper arm 22 extending upward from the cylindrical part 21, a lower arm 23 extending downward from the cylindrical part 21, the accelerator pedal 24, the contact part 25, a guide part 26, a spring receiving part 27, and a concave relief part 28.

Here, the upper side and the lower side indicate an upper side and a lower side in a vertical direction in a state in which the accelerator pedal device is mounted on a vehicle or the like.

The cylindrical part 21 includes an inner circumferential surface 21a fitted to the support shaft 11c of the first housing 11 via a bearing RB, an outer circumferential surface 21b fitted to the fitting concave part 12c of the second housing 12 via the bearing RB, and an inner circumferential surface 21c in which the armature 61 and the permanent magnet 62 of the position sensor 60 are disposed so that the pedal arm 20 can be swingably supported about the axis S.

The upper arm 22 includes a contact part 22a that comes into contact with the rest stopper 11g in a rest position.

The lower arm 23 includes a contact part 23a that comes into contact with the fully open stopper 11h in a maximum depressed position.

The contact part 25 is formed as a flat surface comes in contact with the slider 30 in a region facing the sliding direction H of the upper arm 22 and on a first straight line L1 passing through the axis S, that is, on a plane including the axis S and the first straight line L1 perpendicular to the axis S.

Then, the contact part 25 exerts a pressing force on the slider 30 while separably in contact with the slider 30 in the swing direction H and comes slidably in contact with the slider 30 in accordance with a swinging operation of the pedal arm 20 in a direction along the first straight line L1.

The guide part 26 is formed in a ridge protruding from the contact part 25 and extending in a direction of the first straight line L1 in two regions of the region facing the sliding direction H of the upper arm 22 and a region near the contact part 25 which are spaced apart in the axis S direction.

The two guide parts 26 are configured to guide two inner edges 35a of the slider 30, that is, configured to guide the slider 30 in the direction of the first straight line L1 toward an inner wall (sliding surface 11d) of the housing 10.

The spring receiving part 27 is formed to protrude in a two-step cylindrical shape that defines an annular seating surface in the region facing the sliding direction H of the upper arm 22 and the region near the contact part 25.

The spring receiving part 27 is configured to pass through a through hole 30a of the slider 30 in a non-contact manner and receive the other end part 52 of the return spring 50.

The concave relief part 28 is formed to be hollowed out in a groove shape extending in an expansion and contraction direction of the biasing spring 40 on an outer circumferential region of the cylindrical part 21.

Also, the concave relief part 28 is formed so that the biasing spring 40 compressed between the spring receiving part 11e of the housing 10 and a spring receiving part 33 of the slider 30 can be disposed in a non-contact manner.

According to this, since the biasing spring 40 can be disposed in the vicinity of the cylindrical part 21, parts can be arranged together around the axis S while a function of the hysteresis generation mechanism is secured and thereby downsizing of the device can be achieved.

The slider 30 is formed of a resin material, for example, a highly slidable material such as oil-impregnated polyacetal. The slider 30 is formed to include a first outer contour part f1 whose outer contour on a plane perpendicular to the swing direction H has a substantially rectangular shape and a second outer contour part f2 whose outer contour on a plane parallel to the swing direction H has a substantially fan shape with an acute angle.

Also, the slider 30 is formed in a hollowed-out shape so that the through hole 30a penetrating in the swing direction H is defined and includes a first contact surface 31, a second contact surface 32, the spring receiving part 33, a circular opening 34, a rectangular opening 35, a cylindrical restricting part 36, and two side surfaces 37.

The first contact part 31 is formed as a flat surface having a substantially rectangular annular shape on a plane perpendicular to the swing direction (sliding direction) H.

The first contact part 31 is slidably in contact with the contact part 25 on the first straight line L1 and is configured to be separable from the contact part 25 in the swing direction H.

The second contact part 32 is formed as a convexly curved arc-shaped surface having a predetermined radius R (curvature 1/R) on a plane perpendicular to the axis S.

Also, the second contact part 32 is configured to slide in the sliding direction H with respect to the sliding surface 11d of the housing 10.

The spring receiving part 33 is formed as a flat annular seating surface facing the swing direction (sliding direction) H.

Also, the spring receiving part 33 is configured to receive the other end part 42 of the biasing spring 40 on a second straight line L2 that forms a predetermined acute angle θ with the first straight line L1 on a side closer to the contact part 25 than the axis S in a state in which the slider 30 is assembled.

According to this, a biasing force of the biasing spring 40 acts to press the slider 30 against the sliding surface 11d of the housing 10 in a direction perpendicular to the second straight line L2. Accordingly, a frictional force due to the sliding can be adjusted by appropriately selecting the predetermined acute angle θ formed by the first straight line L1 and the second straight line L2.

Therefore, desired hysteresis characteristics can be set according to specifications of accelerator pedal devices.

The circular opening 34 is formed to receive the return spring 50 in the through hole 30a in a non-contact manner.

Thus, the other end part 52 of the return spring 50 is disposed to be in contact with the spring receiving part 27 of the pedal arm 20.

The rectangular opening 35 is configured to pass the spring receiving part 27 of the pedal arm 20 in a non-contact manner and to define the two inner edges 35a extending parallel to the first straight line L1.

Also, the two inner edges 35a are configured to be in contact with the two guide parts 26 of the pedal arm 20 from both sides in the axis S direction.

Therefore, the slider 30 is guided by the guide parts 26 to be able to reciprocate in the direction of the first straight line L1 toward the sliding surface 11d of the housing 10.

The cylindrical restriction portion 36 is formed to protrude in a cylindrical shape inside the spring receiving part 33 and in an edge region of the circular opening 34.

Also, the cylindrical restricting part 36 is configured to regulate a positional deviation of the biasing spring 40 from the spring receiving part 33 by being fitted inside the biasing spring 40 in a state in which the other end part 42 of the biasing spring 40 is in contact with the spring receiving part 33.

The two side surfaces 37 are formed as substantially flat surfaces parallel to a plane perpendicular to the axis S.

Also, widths of the two side surfaces 37 in the axis S direction are formed to have dimensions with which an inner wall surface of the side wall part 11a of the first housing 11 and an inner wall surface of the side wall part 12a of the second housing 12 are not in contact in an incorporated state. Further, the widths may be sizes that cause as little frictional resistance as possible even when in contact.

The slider 30 according to the above-described embodiment can be formed so that a partial region of the first outer contour part f1 and an arc-shaped region of the second outer contour part f2 slide on the inner wall (sliding surface 11d) of the housing 10, and one side of the second outer contour part f2 in the swing direction H is in contact with the contact part 25 and the other side receives the biasing spring 40. Therefore, the slider 30 can be easily molded using a resin material or the like while weight reduction is achieved by forming it as one component having a simple form.

The biasing spring 40 is a compression type coil-shaped expansion and contraction spring formed of spring steel or the like and is mounted to be expandable and contractible in the swing direction H in a state in which it is compressed to a predetermined compression allowance with one end part 41 in contact with the spring receiving part 11e of the first housing 11 and the other end part 42 in contact with the spring receiving part 33 of the slider 30.

Also, the biasing spring 40 exerts a biasing force for returning the pedal arm 20 to the rest position via the slider 30 and exerts a biasing force for pressing the slider 30 against the sliding surface 11d in cooperation with the contact part 25.

The return spring 50 is a compression type coil-shaped expansion and contraction spring formed of spring steel or the like and is mounted to be expandable and contractible in the swing direction H in a state in which it is compressed to a predetermined compression allowance with one end part 51 in contact with the spring receiving part 11f of the first housing 11 and the other end part 52 in contact with the spring receiving part 27 of the pedal arm 20.

Also, the return spring 50 is formed to have an outer diameter dimension smaller than an inner diameter dimension of the biasing spring 40 and is coaxially disposed inside the biasing spring 40 in a nested manner so that they are not in contact with each other.

Also, the return spring 50 is configured to exert a biasing force directly on the pedal arm 20 in order to return the pedal arm 20 to the rest position.

Here, between an outer circumference of the return spring 50 and an inner circumference of the biasing spring 40, an interposed member SM formed of a sponge, rubber, a resin, or the like having flexibility in a cylindrical shape may be interposed.

According to this, when the biasing spring 40 and the return spring 50 perform expansion and contraction operations, due to the interposed member SM interposed therebetween, interference therebetween can be prevented, and thus generation of a collision sound or the like can be prevented.

Here, since the biasing spring 40 and the return spring 50 are disposed in one internal space (concave part C) of the housing 10, parts can be disposed together, and thereby downsizing of the housing 10, downsizing of the device, or the like can be achieved as compared with a configuration in which they are disposed in separate regions.

Particularly, since the biasing spring 40 and the return spring 50 are coaxially disposed in a nested manner, it is practically sufficient as the disposition area when only an area to be occupied by the biasing spring 40 is secured, which can further contribute to the downsizing of the housing 10, the downsizing of the device, or the like.

Also, since the return spring 50 is formed to directly engage with the spring receiving part 27 of the pedal arm 20 to exert a biasing force to return the pedal arm 20 to the rest position, even when a state in which an operation failure such as the slider 30 being stuck to the sliding surface 11d of the housing 10 and stopped occurs, the pedal arm 20 is reliably returned to the rest position by the biasing force of the return spring 50, and safety is guaranteed.

The position sensor 60 is disposed in the cylindrical part 21 of the pedal arm 20 and the embedded part 12n of the second housing 12 in a region around the axis S of the pedal arm 20.

The position sensor 60 is, for example, a non-contact type magnetic sensor, and is constituted by the annular armature 61, a pair of permanent magnets 62, two stators 63, and two Hall elements 64.

The armature 61 is annularly formed of a magnetic material and is fixed to the inner circumferential surface 21c of the cylindrical part 21 of the pedal arm 20.

The pair of permanent magnets 62 are formed in an arc shape and are coupled to an inner circumferential surface of the armature 61.

The two stators 63 are formed of a magnetic material and embedded in the embedded part 12n of the second housing 12.

The two Hall elements 64 are embedded in the embedded part 12n of the second housing 12 while disposed between the two stators 63.

Also, the circuit board CB is disposed in the accommodating part 12p of the second housing 12 and sealed by a seal member G.

The circuit board CB includes a circuit that electrically connects the Hall elements 64 and includes various electronic parts mounted thereon.

The position sensor 60 detects a change in magnetic flux density caused by rotation of the pedal arm 20 using the Hall elements 64 and outputs the change as a voltage signal. The output signal is detected by a detector (not illustrated) connected to the connector 12q as information of an angular position of the pedal arm 20.

An operation of the hysteresis generation mechanism configured of the slider 30, the contact part 25 and the biasing spring 40 will be described below with reference to FIGS. 5, 7 and 8 to 10.

Figure 5:
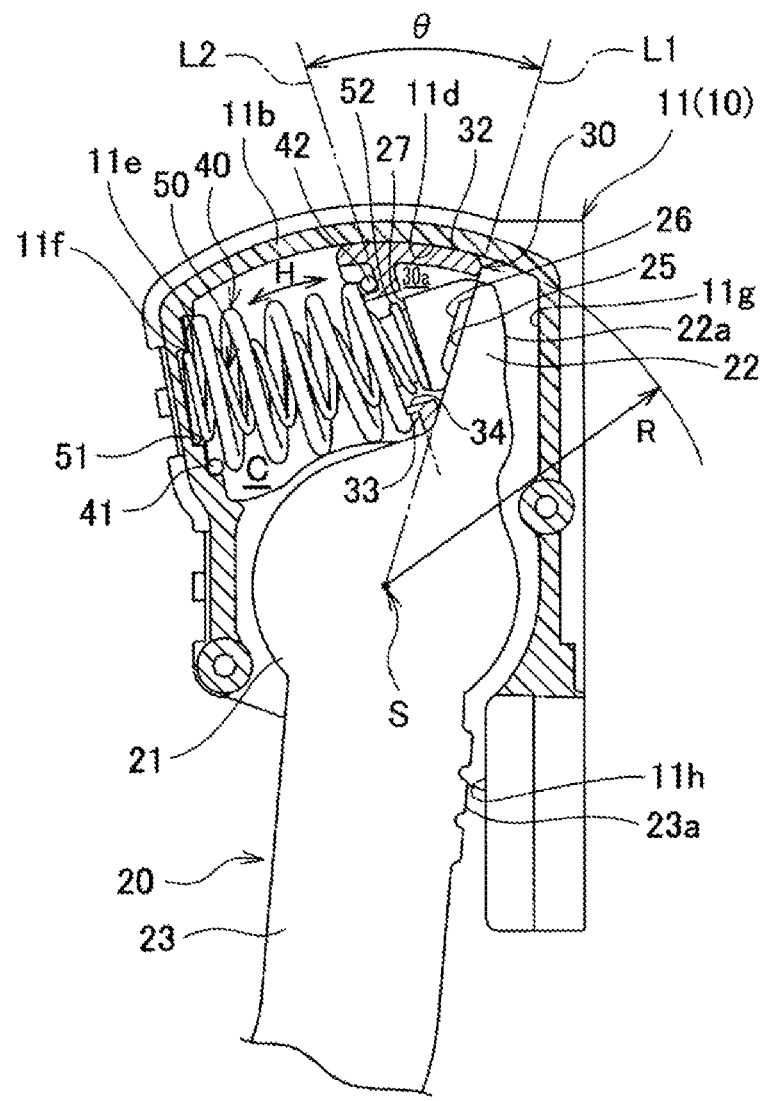
FIG. 5 is a partial cross-sectional view illustrating an inside of the accelerator pedal device illustrated in FIG. 1.
Figure 6:
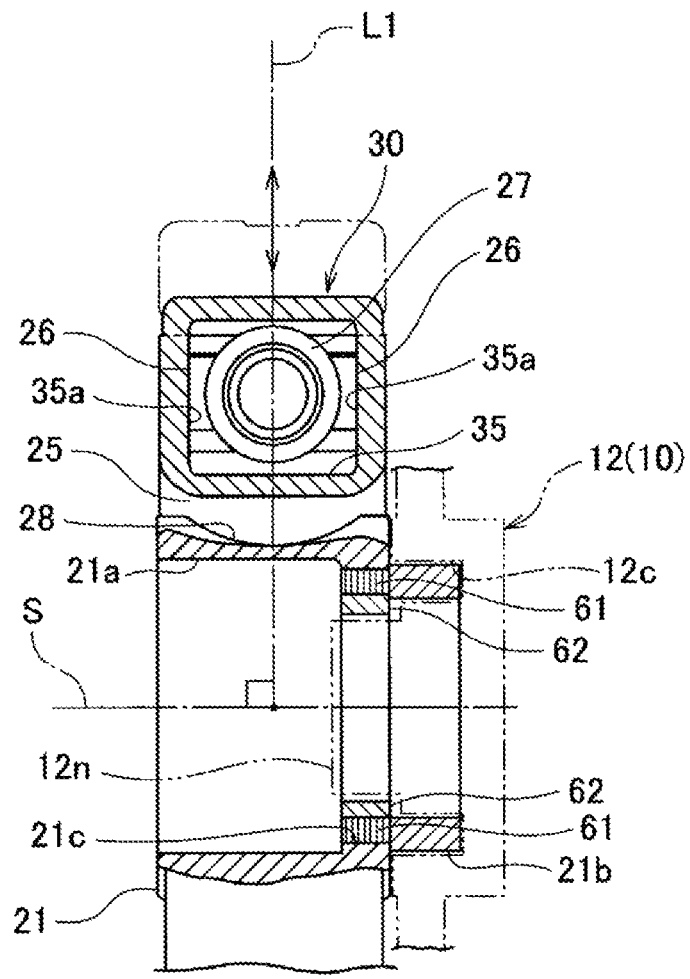
FIG. 6 is a partial cross-sectional view illustrating a relationship of the contact part and a guide part with the slider of the pedal arm included in the accelerator pedal device illustrated in FIG. 1.
Figure 8:
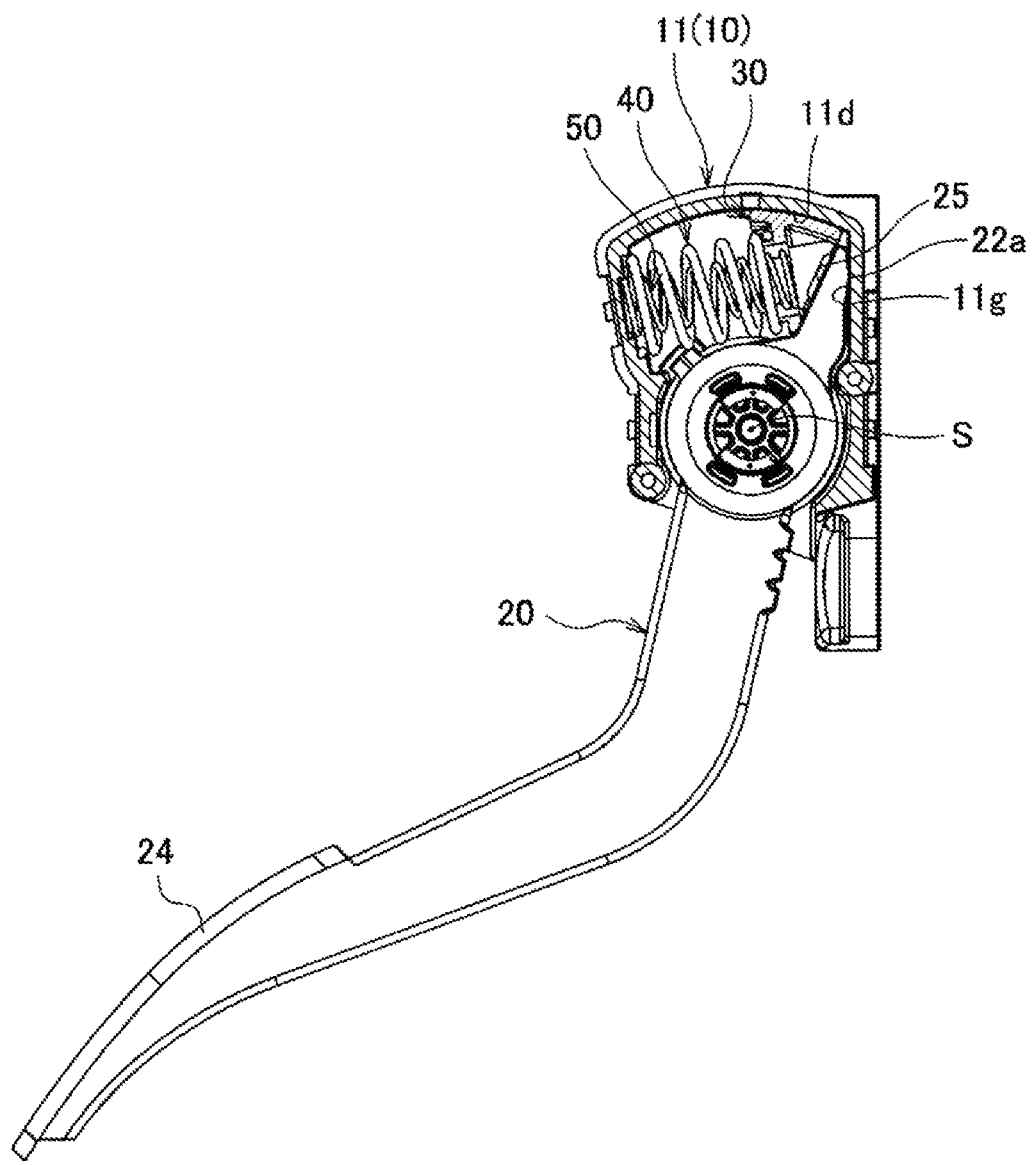
FIG. 8 is a cross-sectional view illustrating a state in which the pedal arm is at a rest position in the accelerator pedal device illustrated in FIG. 1.
Figure 9:
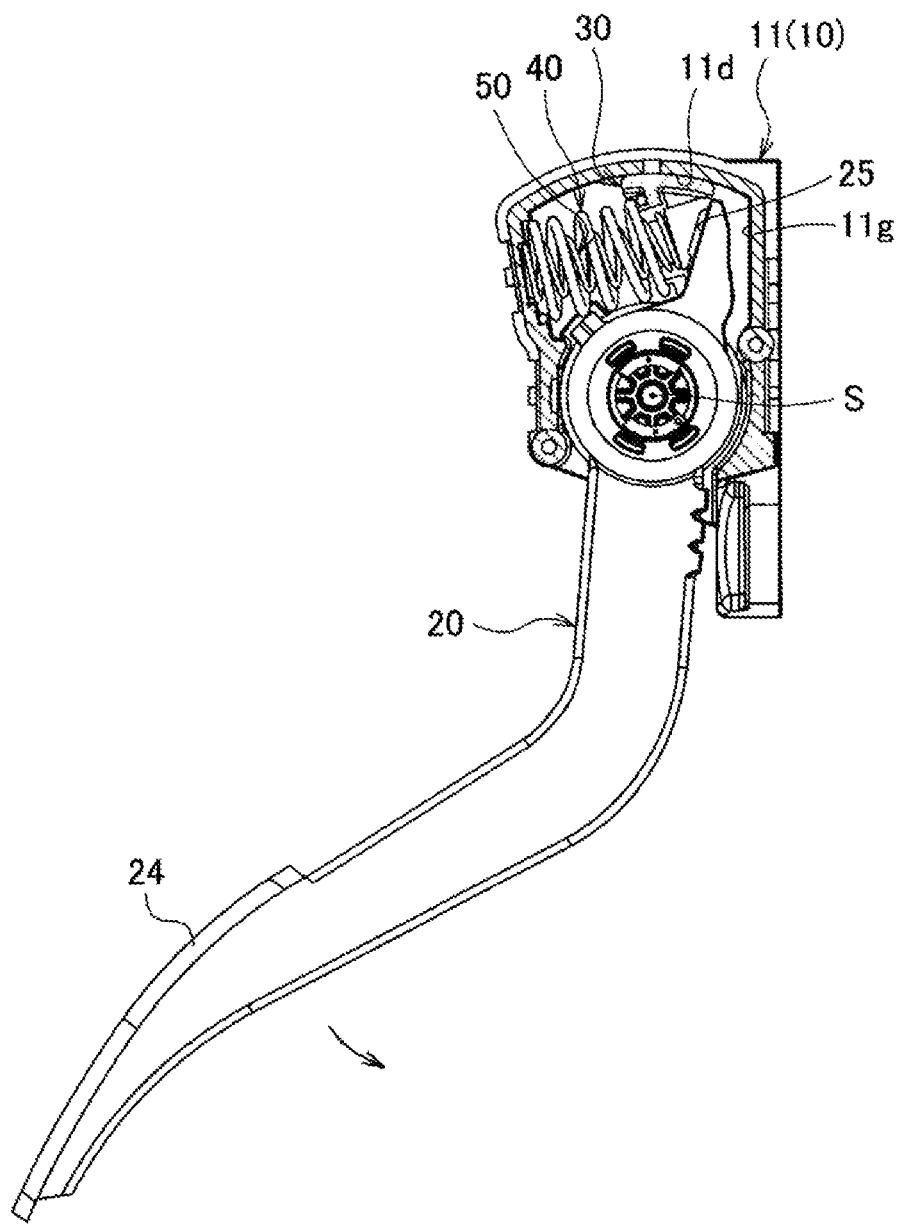
FIG. 9 is a cross-sectional view illustrating a state in which the pedal arm is at an intermediate position between the rest position and a maximum depressed position in the accelerator pedal device illustrated in FIG. 1.
Figure 10:
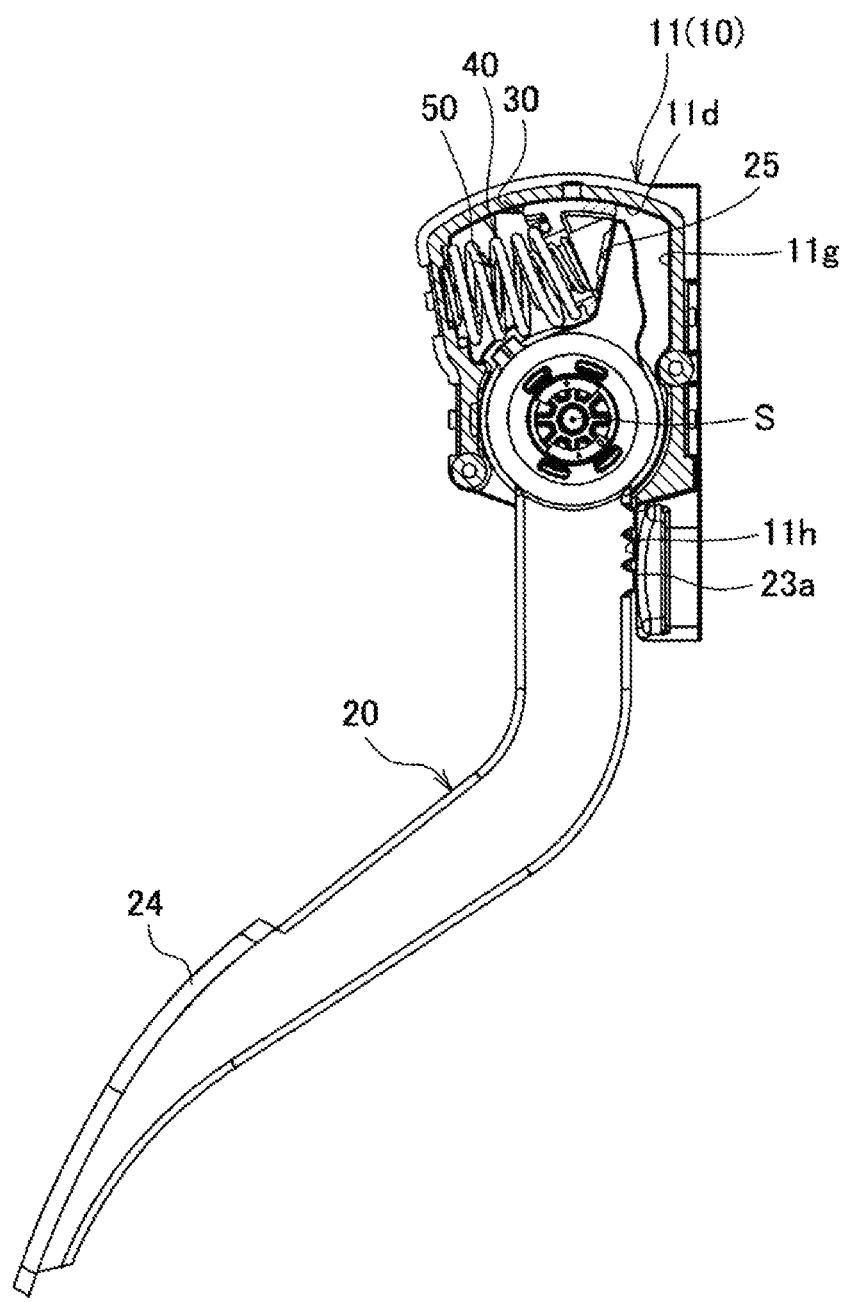
FIG. 10 is a cross-sectional view illustrating a state in which the pedal arm is at the maximum depressed position in the accelerator pedal device illustrated in FIG. 1.

First, when the pedal arm 20 is depressed against the biasing force of the return spring 50 and the biasing spring 40 from the rest position illustrated in FIG. 8, through the intermediate position illustrated in FIG. 9, and toward the maximum depressed position (fully open position) illustrated in FIG. 10, the contact part 25 presses the slider 30 in the left direction in FIG. 5 against the biasing force of the biasing spring 40.

At this time, a frictional force (sliding resistance) is generated between the second contact surface 32 of the slider 30 and the sliding surface 11d of the housing 10 due to a wedge action that the contact part 25 exerts while pressing the first contact surface 31 of the slider 30. This frictional force acts in a direction opposite to a moving direction of the slider 30, that is, in a direction opposite to the depressing operation.

Figure 7:
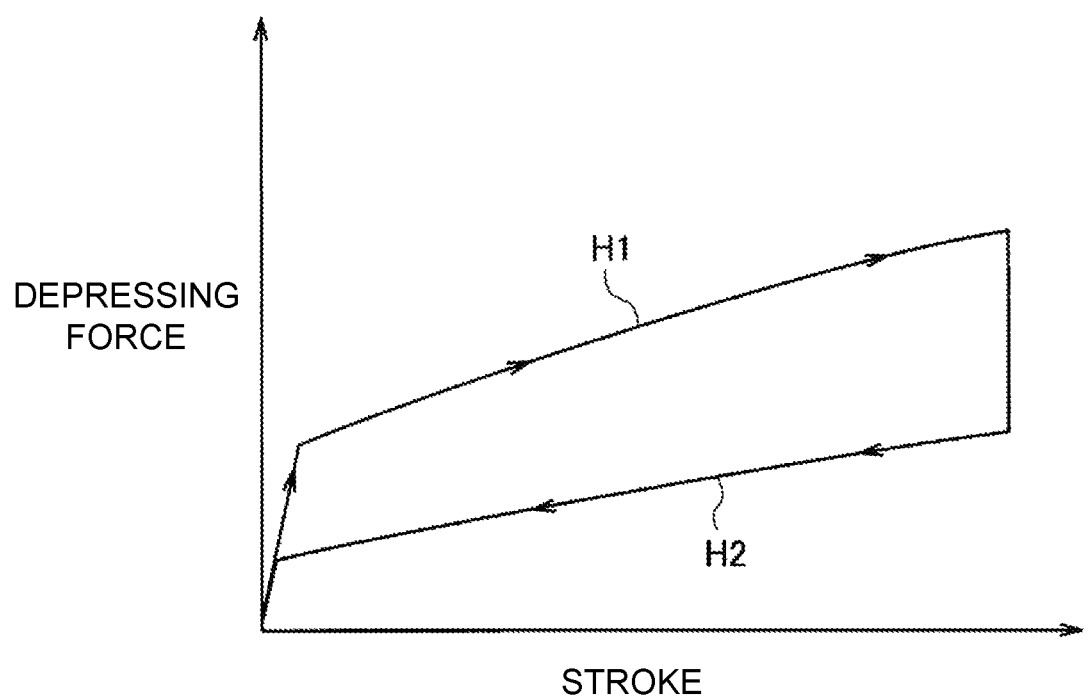
FIG. 7 is a graph showing a depressing force characteristic of the accelerator pedal device illustrated in FIG. 1.

Therefore, a frictional force acting in the same direction is added to the biasing force of the biasing spring 40 which increases according to the depressing operation, and the depressing force linearly increases in accordance with the increase in the depressing amount (stroke) as indicated by H1 in FIG. 7.

On the other hand, when the pedal arm 20 is returned toward the rest position according to the biasing force of the return spring 50 and the biasing spring 40, the slider 30 follows the contact part 25 due to the biasing force of the biasing spring 40 and moves in the right direction in FIG. 5.

During this return operation, the frictional force (sliding resistance) generated by the wedge action that the contact part 25 exerts while pressing the first contact surface 31 of the slider 30 acts in a direction opposite to the moving direction of the slider 30, that is, in a direction opposite to the case of the depressing operation.

Therefore, the frictional force acting in the opposite direction is added to the biasing force of the biasing spring 40 which decreases according to the return operation, and the depressing force linearly decreases in accordance with the decrease in the depressing amount (stroke) as indicated by H2 in FIG. 7.

Here, since the depressing force at the time of the return operation is smaller than the depressing force at the time of the depressing operation, as illustrated in FIG. 7, hysteresis (H1 and H2) can be generated in the entire depressing force (pedal load) from the depressing operation to the return operation.

Next, an operation of the accelerator pedal device will be described with reference to FIGS. 8 to 11.

First, in the rest position in which the accelerator pedal 24 is not depressed by a driver, due to the biasing force of the return spring 50 and the biasing spring 40, the contact part 22a of the upper arm 22 of the pedal arm 20 is in contact with the rest stopper 11g and the pedal arm 20 is stopped at the rest position as illustrated in FIG. 8.

At this time, the contact part 25 of the pedal arm 20 is separably in contact with the first contact surface 31 of the slider 30 on the first straight line L1.

From this state, when the driver depresses the accelerator pedal 24, the pedal arm 20 rotates counterclockwise against the biasing force of the return spring 50 and the biasing spring 40 as illustrated in FIG. 9 and rotates to the maximum depressed position (fully open position) illustrated in FIG. 10 while increasing a resistance load generated by the hysteresis generation mechanism (H1 in FIG. 7), and the contact part 23a comes into contact with the fully open stopper 11h and stops.

On the other hand, when the driver releases the depressing force, the pedal arm 20 rotates toward the rest position due to the biasing force of the return spring 50 and the biasing spring 40 while exerting on the driver a resistance load (pedal load) smaller than the resistance load (pedal load) at the time of depressing, and the contact part 22a comes into contact with the rest stopper 11g and stops at the rest position illustrated in FIG. 8 while the resistance load generated by the hysteresis generation mechanism is decreased (H2 in FIG. 7).

Figure 11:
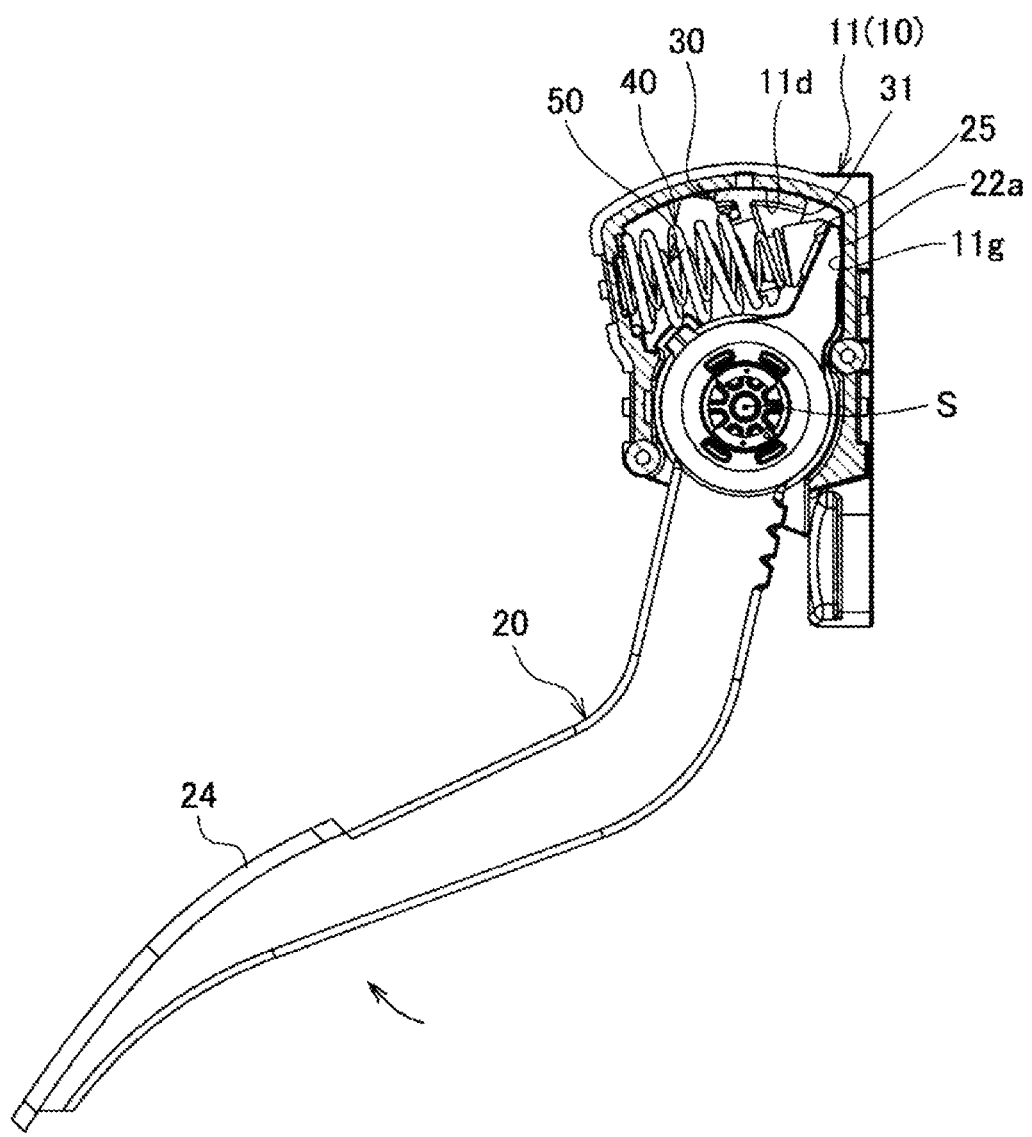
FIG. 11 is a cross-sectional view illustrating a state in which the slider has stopped halfway and the pedal arm has returned to the rest position in the accelerator pedal device illustrated in FIG. 1.

Further, when the driver returns the accelerator pedal 24, even when the slider 30 is stuck to the inner wall of the housing 10 by a stick or the like and does not return, the contact part 25 is separated from the first contact surface 31 of the slider 30 by the biasing force of the return spring 50, and the pedal arm 20 reliably returns to the rest position as illustrated in FIG. 11.

Therefore, since the position sensor 60 detects that the pedal arm 20 has returned to the rest position, desired control can be performed in accordance with the return operation of the driver.

According to the accelerator pedal device having the above-described configuration, since the hysteresis generation mechanism which generates hysteresis in the depressing force is configured only of the contact part 25 integrally formed on the pedal arm 20, one slider 30 sliding on the inner wall of the housing 10, and the biasing spring 40, reduction in the number of parts, simplified structure, downsizing of the device, cost reduction, and the like can be achieved compared to a conventional case in which two sliders or a configuration with two types of parts is employed.

In the above-described embodiment, a configuration in which the return spring 50 is disposed in the same region as the biasing spring 40 and the return spring 50 passes through the through hole 30a of the slider 30 has been described, but the present invention is not limited thereto.

As long as the hysteresis generation mechanism of the above-described configuration, that is, the contact part formed on the pedal arm, one slider sliding on the inner wall of the housing, and the biasing spring, is employed, the return spring 50 may be disposed in another region and a slider in which the through hole 30a is eliminated may be employed.

In the above-described embodiment, a configuration in which the sliding surface 11d of the housing 10 and the second contact surface 32 of the slider 30 are formed in an arc-shaped surface having a predetermined radius R centered on the axis S has been described, but the present invention is not limited thereto and a configuration forming a surface other than an arc-shaped surface may be employed.

In the above-described embodiment, a configuration in which the contact part 25 of the pedal arm 20 is in contact with the first contact surface 31 of the slider 30 on the first straight line L1 passing through the axis S has been described, but the present invention is not limited thereto and a configuration in which they are in contact with each other at a position deviated from the first straight line L1 may be employed.

In the above-described embodiment, a configuration in which the slider 30 receives the other end part 42 of the biasing spring 40 on the second straight line L2 that forms a predetermined acute angle θ with the first straight line L1 on a side closer to the contact part 25 than the axis S has been described, but the present invention is not limited thereto.

As long as the biasing spring 40 exerts a biasing force for pressing the slider 30 against the sliding surface 11d of the housing 10, other configurations may be employed.

In the above-described embodiment, as a slider, the slider 30 including the first outer contour part f1 whose outer contour on a plane perpendicular to the swing direction H has a substantially rectangular shape and the second outer contour part f2 whose outer contour on a plane parallel to the swing direction H has a substantially fan shape with acute angle has been described, but the present invention is not limited thereto.

A slider having another outer contour may be employed as long as it slides on the inner wall of the housing, one side is in contact with the contact part, and the other side receives the biasing spring.

As described above, since the accelerator pedal device of the present invention can obtain desired hysteresis in a depressing force while achieving downsizing and the like, the accelerator pedal device of the present invention is not only applicable to automobiles but also useful for motorcycles and other vehicles.

What is claimed is:

1. An accelerator pedal device comprising:
a pedal arm including an accelerator pedal;
a housing configured to support the pedal arm to be swingable about a predetermined axis between a rest position and a maximum depressed position;
a slider sliding on an inner wall of the housing;
a contact part formed on the pedal arm to exert a pressing force on the slider while separably in contact with the slider; and
a biasing spring disposed between the housing and the slider so that a biasing force pressing the slider against the inner wall and the contact part is increased according to depression of the accelerator pedal,
wherein the slider is configured to slide on the inner wall of the housing along a predetermined curvature centered on the axis
wherein the contact part is configured to be in contact with the slider on a first straight line passing through the axis.

2. The accelerator pedal device according to claim 1, wherein the slider is configured to receive the biasing spring on a second straight line that forms a predetermined acute angle with the first straight line on a side closer to the contact part than the axis.

3. The accelerator pedal device according to claim 2, wherein the pedal arm includes a guide part in the vicinity of the contact part, and the guide part guides the slider toward the inner wall of the housing.

4. The accelerator pedal device according to claim 2, wherein the slider includes a through hole penetrating in a swing direction of the pedal arm.

5. The accelerator pedal device according to claim 1, wherein the pedal arm includes a guide part in the vicinity of the contact part, and the guide part guides the slider toward the inner wall of the housing.

6. The accelerator pedal device according to claim 5, wherein the slider includes a through hole penetrating in a swing direction of the pedal arm.

7. The accelerator pedal device according to claim 1, wherein the slider includes a through hole penetrating in a swing direction of the pedal arm.

8. The accelerator pedal device according to claim 7, wherein the slider includes a through hole penetrating in a swing direction of the pedal arm.

9. The accelerator pedal device according to claim 7, wherein the slider includes:
a first outer contour part whose outer contour on a plane perpendicular to the swing direction has a substantially rectangular shape; and
a second outer contour part whose outer contour on a plane parallel to the swing direction includes a curvature with an acute angle.

10. The accelerator pedal device according to claim 7, wherein
the biasing spring is a compression type coil spring, and the slider includes:
a spring receiving part configured to receive the biasing spring;
a rectangular opening on a side being contacted with the contact part; and
a circular opening on an inner side of the spring receiving part.

11. The accelerator pedal device according to claim 10, wherein the slider includes a cylindrical restricting part fitted inside the biasing spring in an edge region of the circular opening.

12. The accelerator pedal device according to claim 11, wherein
the pedal arm includes:
a cylindrical part centered on the axis;
an upper arm extending upward from the cylindrical part; and
a lower arm extending downward from the cylindrical part,
the upper arm includes the contact part, and
the cylindrical part includes a concave relief part in which the biasing spring is disposed in a non-contact manner.

13. The accelerator pedal device according to claim 1, further comprising a return spring that exerts a biasing force directly on the pedal arm to return the pedal arm to the rest position.

* * * * *